United States Patent

Verburg

[11] Patent Number: 5,797,210
[45] Date of Patent: *Aug. 25, 1998

[54] APPARATUS FOR ELECTRO-FISHING

[76] Inventor: Abraham Leendert Verburg, Havenstraat 11, NL-4486 AA Colijnsplaat, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 666,350
[22] PCT Filed: Jan. 5, 1995
[86] PCT No.: PCT/NL95/00009
 § 371 Date: Jun. 20, 1996
 § 102(e) Date: Jun. 20, 1996
[87] PCT Pub. No.: WO95/18528
 PCT Pub. Date: Jul. 13, 1995

[30] Foreign Application Priority Data

Jan. 5, 1994 [NL] Netherlands ............ 9400010

[51] Int. Cl.$^6$ ...................................... A01K 73/02
[52] U.S. Cl. ........................................... 43/9.6
[58] Field of Search .................. 43/9.6, 17.1, 9.1

[56] References Cited

U.S. PATENT DOCUMENTS

| | | | |
|---|---|---|---|
| 3,043,041 | 7/1962 | Kreutzer | 43/17.1 |
| 3,110,978 | 11/1963 | Kreutzer . | |
| 3,312,011 | 4/1967 | Wathne et al. | 43/9.6 |
| 3,415,001 | 12/1968 | Ott et al. | 43/9.6 |
| 3,483,649 | 12/1969 | Klima et al. . | |
| 3,491,474 | 1/1970 | Metcalf . | |
| 3,777,388 | 12/1973 | Newman et al. . | |
| 4,417,301 | 11/1983 | Newman . | |
| 5,111,379 | 5/1992 | Sharber et al. . | |
| 5,233,782 | 8/1993 | Sharber et al. . | |

FOREIGN PATENT DOCUMENTS

| | | | |
|---|---|---|---|
| 64617 | 11/1968 | Germany | 43/17.1 |
| 117000 | 12/1957 | U.S.S.R. | 43/17.1 |
| 235507 | 1/1969 | U.S.S.R. | 43/9.6 |
| 699346 | 11/1953 | United Kingdom . | |
| WO 83/00983 | 3/1983 | WIPO . | |

*Primary Examiner*—Thomas Price
*Attorney, Agent, or Firm*—Young & Thompson

[57] ABSTRACT

Electro-fishing apparatus comprising a trawling net (16) which during operation is towed over the bottom, a combination of electrodes (10, 12) which, during operation, are towed over the bottom at a distance in front (14) of the net (16), and a pulse generator (28) which is connected to electrodes (10, 12) to generate during operation a pulsed electric field in the water. The electrodes comprise at least partly a number of electrically conducting bodies (10a, 10b, 10c, . . . ) each through a separate connection cable connected to pulse generator (28), whereby the water contacting surface of each electrically conducting body (10) is limited such that a specific electrical resistance is created. The pulse generator (28) is embodied such that each of electrically conducting bodies (10) can be powered separately to generate a field between the momentaneously powered electrically conducting body (10) and another electrode (12).

7 Claims, 5 Drawing Sheets

1

APPARATUS FOR ELECTRO-FISHING

FIELD OF THE INVENTION

The invention relates to an apparatus for electro-fishing comprising
- a trawl net which during operation is towed over the bottom,
- a combination of electrodes which, during operation, are towed over the bottom at a distance in front of the net,
- a pulse generator which is connected to said electrodes to generate during operation a pulsed electric field in the water.

BACKGROUND OF THE INVENTION

Apparatuses for electro-fishing of the above-described type are already known from various patent publications. The attention is drawn for example to U.S. Pat Nos. 3,483,649, 3,491,474, 3,110,978, 3,777,388, 4,417,301, 5,111,379, and 5,233,782.

In the apparatuses described in U.S. Pat Nos. 3,483,649 and 3,491,474, the electrodes are embodied as a number of not insulated electrical conductors which are positioned in front of the trawl net over the full width thereof and mutually parallel.

The electrodes which are applied in the apparatuses described in U.S. Pat. Nos. 3,777,388 and 4,417,301 consist of a number of elongated not insulated electrical conductors, which, mutually parallel, extend in the trawling direction, i.e. perpendicular to the front edge of the trawl net. Also in this case all anode conductors and all cathode conductors are powered simultaneously by the pulse generator.

The use of relatively long, mutually parallel extending non insulated electrical conductors as electrodes has a number of disadvantages. In the first place sea water is well-conducting. It may be expected therefore, that the total impedance, which in such an embodiment of the electrodes is connected to the pulse generator, is relatively small with the result that the pulse generator has to produce relatively large current pulses to realize the desired field gradient between the electrodes. A further disadvantage is encountered in the fact that the field strength varies along the length of the electrical conductors, near the pulse generator the field strength will be high and as the distance increases the field strength will decrease. Therefore, a field with the same strength will not be generated everywhere and as a result thereof the fish, which are on or in the bottom, will not everywhere receive the same stimulation.

The electrodes which belong to the apparatus as described in U.S. Pat. No. 3,110,978 comprise one or more anode-components and one or more cathode-components. Irrespective of the number of elements all electrodes are simultaneously powered from the pulse generator. In this publication no details are provided about the embodiment of the electrodes themselves. The use of separate electrode components in this apparatus has not resulted in a decrease of the power to be supplied. In this publication pulses with a peak voltage of 700 V and a peak current of 10,500 Amp are mentioned. To be able to switch such voltages and currents the switching elements in the pulse generator have to fulfil very high requirements.

In the U.S. Pat. Nos. 5,111,379 and 5,233,782 no details are provided about the electrodes, although an embodiment of the pulse generator is considered in more depth. Especially a pulse generator is described destined to supply pulse trains with a number of relatively high frequency pulses, which pulse trains are provided in a relatively low frequent pace to the electrodes. Furthermore, these publications consider in more depth the relation between the strength of the generated electric field and the influence thereof on the fish arriving in said field. Not only the field strength as such is of importance, also the steepness of the pulses, used for generating said field, has influence on the reactions, evoked in the fish.

SUMMARY OF THE INVENTION

The object of the invention is now to provide an apparatus which is specially destined for at least temporarily anaesthetizing or stunning the fish, arriving in the generated field and using therefore a pulse generator with a relatively restricted power output.

In agreement with said object the invention now provides an apparatus as described in the first paragraph, which is characterized in that
- at least part of the electrodes comprises a number of electrically conducting bodies, each through a separate connection cable connected to said pulse generator, whereby the water contacting surface of each electrically conducting body is limited such that a specific electrical resistance is created,
- the pulse generator is embodied such that each of said electrically conducting bodies can be powered separately to generate a field between the momentaneously powered electrically conducting body and another electrode.

Because the pulse generator each time supplies current pulses to one electrically conducting body of which the water contacting surface is restricted and has as result thereof a certain resistance, the current to be supplied by the pulse generator is restricted. Although a field of restricted extension is thereby created, by activating each time another combination of an electrically conducting body and a counter electrode nevertheless a large bottom area, especially a strip of ground directly in front of the trawl net, is each time locally stimulated.

In a simple embodiment the other electrode comprises an elongated conductor extending at a predetermined distance parallel to the first electrode which comprises a linear series of electrically conducting bodies. This embodiment has the advantage that the pulse generator only has to switch between the electrically conducting bodies forming the one electrode, the other electrode embodied as an elongated conductor, can be connected steadily to the pulse generator and does not have to be switched. A disadvantage of this embodiment, however, is that the generator field fans out in the direction of the elongated conductor and presents therefore a rather strongly varying field gradient.

A much better defined field is each time obtained in case the other electrode is also formed by one of the electrically conducting bodies. In that case each time a field is generated between two electrically conducting bodies with restricted surface, the gradient of the field being well controllable. Preferably both electrodes are embodied as a linear array of electrically conducting bodies, whereby both arrays have a predetermined mutual distance.

A disadvantage of the above-described embodiments could be that the number of switching elements in the pulse generator is relatively large because each time in both arrays electrically conducting bodies have to be switched. This disadvantage can be eliminated by comprising the apparatus with one single linear array of electrically conducting bodies, where the other electrode is each time formed by one

3 of the electrically conducting bodies which is adjacent in the array. In that case no field is generated between two electrodes which are one behind the other in the trawling direction, but between two electrodes which are neighbouring in the trawling direction.

The invention will be explained in more detail with reference to the attached drawings.

DESCRIPTION OF THE PREFERRED EMBODIMENTS

Figure 1:
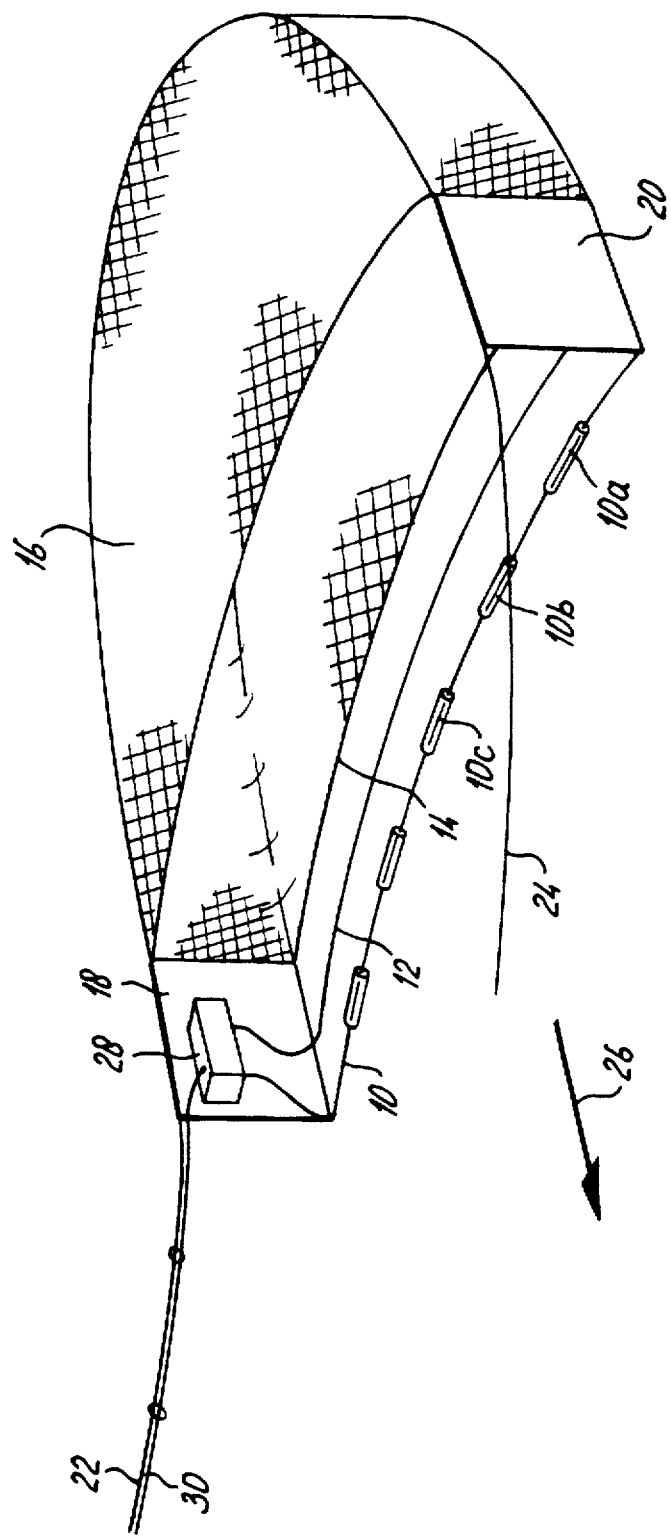
FIG. 1 illustrates schematically a trawl net with in front thereof positioned electrodes according to the invention during operation.

FIG. 1 illustrates a first embodiment of the electrodes, which can be applied in an apparatus according to the invention. In this figure the first electrode is referenced by 10, the second electrode extending parallel thereto is referenced by 12 and both electrodes are extending parallel to the front edge 14 of the trawl net 16. The electrodes 10, 12 and the trawl net 16 are attached to doors 18 and 20. During operation the whole combination is dragged across the bottom of the fishing grounds in the direction of the arrow 26 through the drag cables 22 and 24 by a ship which is not illustrated in the figure. The electrodes 10 and 12 are connected to a pulse generator 28 which is attached to one of the doors 18 and which is by means of an electrical cable 30 powered from a power source on board the ship such as an accumulator or a generator. This power source is not indicated in the figure. For details the attention is amongst others drawn to the above-mentioned patent publications and to further literature, which is accessible to the average practitioner.

In FIG. 1 the electrode 10 is embodied as an electrode which comprises a number of separate electrically conducting bodies 10a, 10b, 10c, . . . , which each are separately connected through an electrical cable to the pulse generator 28 in a manner as will be explained in more detail with reference to FIG. 2. Furthermore, in this example the electrode 12 is embodied as an elongated non-insulated electrical conductor which also is connected through a connecting cable to the pulse generator 28.

Figure 2:
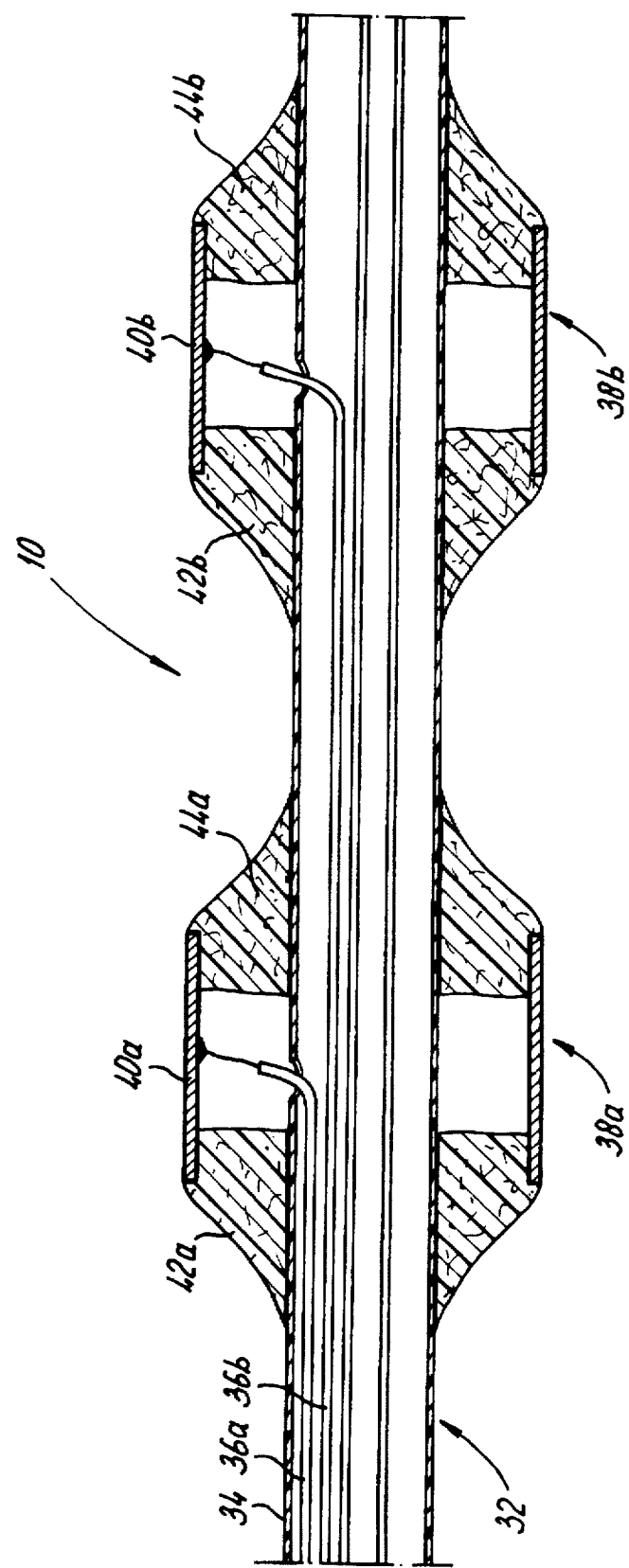
FIG. 2 shows a cross section through a possible embodiment of the cable with electrode segments according to the invention.

FIG. 2 illustrates a cross section through a possible embodiment of the electrode 10. In this embodiment the electrode comprises a central element consisting of a well-insulated multicore cable 32 of which the jacket is referenced by 34. Within said jacket there are a number of mutually insulated conductors 36a, 36b, . . . of which the number corresponds with the number of electrically conducting bodies positioned around the central multicore cable 32. Two of said electrically conducting bodies are in general referenced by 38a and 38b. Each of the bodies 38a, 38b, . . . is, as is shown in the figure, embodied as a ring or sleeve of

4 conducting material 40a, 40b, . . . Each of these rings is shifted onto the cable 32 and thereafter attached by means of sealing elements 42a, 44a, 42b, 44b. These sealing elements can be formed by means of a pliable elastic mass, such as pliable rubber or something similar. Before fixing each of the electrode segments a passage is made in the jacket of the cable 32 at a location within the respective ring 40 and through said passage one of the conductors 36 is drawn out of the cable. After clearing the end of the respective conductor such that the actual core will be revealed, this inner core is in a suitable manner attached to the metal ring 40. In FIG. 2 this is shown for the conductors 36a and 36b. It will be clear from this figure that, by using the sealing elements 42 and 44, it is prevented that water will penetrate into the tube 40 and therewith eventually could penetrate into the cable 32.

As a result of the construction, schematically illustrated in FIG. 2, only the outer surfaces of the rings or sleeves 40a, 40b, . . . , are in contact with seawater. The dimensioning of the sleeves 40 is selected such that a predetermined resistance is created which on the one hand is dependent on the surface of the sleeve 40 being in contact with seawater and which is on the other hand mainly dependent on the salinity of the seawater. The smaller the surface of the sleeve 40, the greater the resistance; the greater the salinity of the water, the smaller the resistance. The surface of the sleeve 40 can therefore be used to restrict the current, which has to be supplied by the connected pulse generator, to a predetermined maximum.

Figure 3:
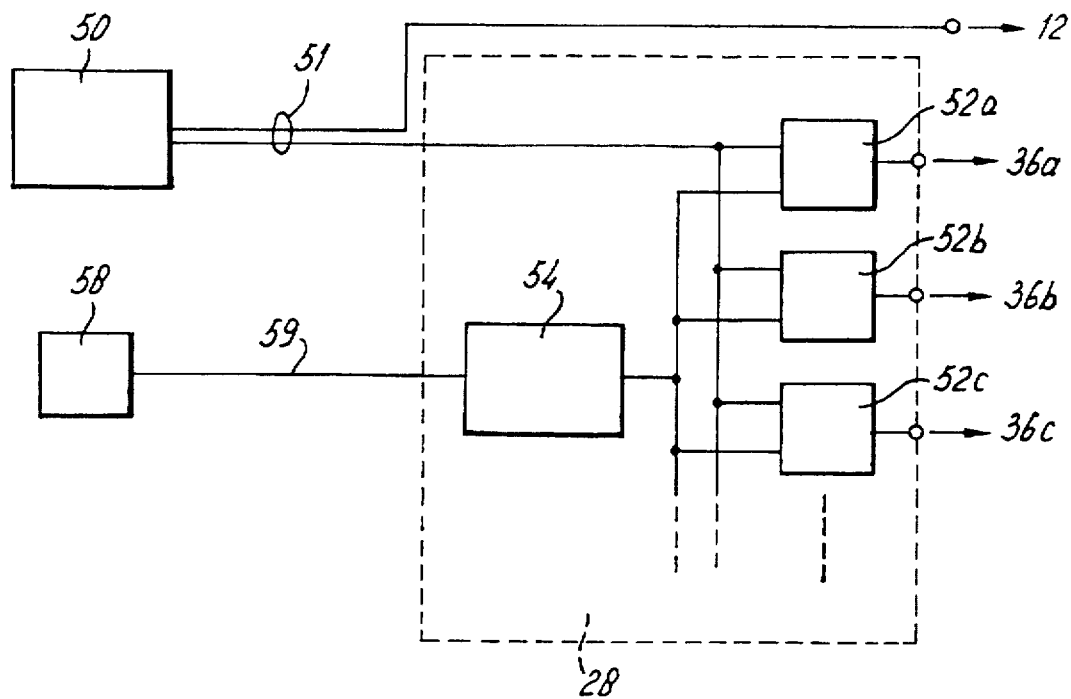
FIG. 3 shows an embodiment of the power supply and control circuit according to the invention.

FIG. 3 illustrates a possible embodiment of a pulse generator which can be applied in the apparatus according to the invention. The pulse generator is connected to a power supply source 50, for instance comprising one or more accumulators, an AC voltage generator in combination with a rectifying circuit or something similar. This power supply source 50 supplies energy through cable 51 on the one hand to the electrode 12 and on the other hand to a number of switching circuits 52a, 52b, . . . The outputs of these switching circuits are connected to the various conductors 36a, 36b, . . . within the cable 32. The inputs of these switching circuits are connected to an electronic control circuit 54 in which control pulses are generated to sequentially switch the switching circuits each separately such that through the respective conductor 36 a current pulse is supplied to the respective electrically conducting body. The components 52a, 52b, . . . and 54 are confined within a watertight sealed housing which is schematically indicated by the enclosure 28. This enclosure 28 is attached to one of the doors 18 as is shown in FIG. 1. The energy source 50 is located on board of a ship and a cable 30 extends from the ship to the actual generator 28. It is possible to embody the generator 28 such that the generator can function automatically without external signals and will be switched on for instance as soon as the generator will reach a predetermined depth. However, it is also possible, as is schematically illustrated in FIG. 3, to install a control unit 58 on board of the ship and to connect this control unit through a control cable 59 to the electronic control circuit 54 within the generator 28.

It is furthermore conceivable to locate the power source within the watertight enclosure 28 (or eventually within a separate enclosure), such that the long power supply cable between the source 50 and the various switching circuits can be reduced to a short direct connection. Such an embodiment of the system, however, will only be practical applicable as the dimensions of the power source are small enough. An example of small enough power sources are the gas generators which are available at this moment.

Figure 4A:
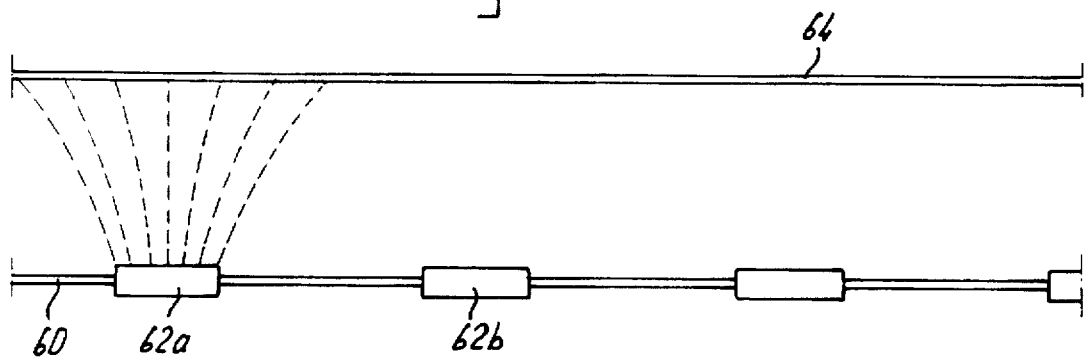
FIGS. 4a . . . 4c illustrate alternative embodiments of the electrodes.

Within the scope of the invention a combination of electrodes may come in various shapes, some of which are illustrated in FIG. 4. FIG. 4a shows schematically a configuration with a first electrode 60, comprising a number of separate electrically conducting bodies 62a, 62b, as described above and a second electrode 64 consisting of one elongated conductor. If the conductor 64 is steadily connected to one terminal of the power supply and the electrically conducting bodies 62a, 62b, . . . are sequentially one after the other connected through the pulse generator, then each time a field will be generated of which the shape is approximately schematically illustrated between the conducting body 62a and the elongated conductor 64.

The pace with which the various bodies 62 are switched depends on the speed of dragging the configuration across the bottom. If the distance between both electrodes 60 and 64 is equal to L and there are as a whole k electrically conducting bodies 62 present within the electrode 60 and the ship is dragging with a speed v, then the switching frequency should be at least k.v/L. Furthermore, the mutual distance between the various conducting bodies 62a, 62b, . . . should be selected such, that the each time generated fields are at least partly overlapping.

Figure 4B:
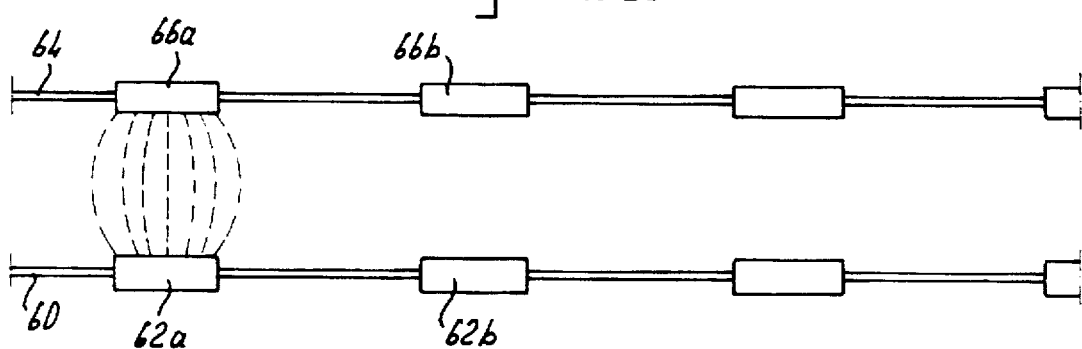

The fields generated each time between each of the bodies 62 and the conductor 64 show a significant fan out near the conductor 64, indicating a significant variation in the field strength over the distance L. A more defined situation can be obtained in case the configuration of FIG. 4b is applied. In this embodiment also the electrode 64 is embodied as an electrode comprising separate conducting bodies 66a, 66b, . . . By switching these separate bodies 66a, 66b synchronously with the bodies 62a, 62b, . . . each time a well defined field is generated of which the shape is schematically shown between the bodies 62a and 66a. The fan out of the field and therewith the variation in field strength is in this case less significant and therefore this configuration is suitable to generate an accurately quantified field of sufficient strength to stimulate and anaesthetize the fish, present in the bottom, without generating locally high intensities causing electrocution of the fish. It is the object to get the fish alive and well within the trawl net. It is furthermore preferred in this embodiment that the surfaces of the separate electrode segments 62a, 66a, . . . are equal to minimize therewith the variation in field strength and to at least define said variation enabling by a proper selection of voltage and current to generate the desired field strength with the desired anaesthetic effect.

Figure 4C:
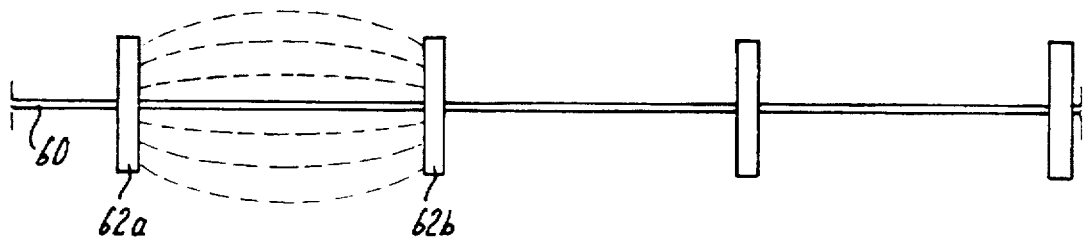

A disadvantage of the configuration in FIG. 4b is found in the fact that the number of power switches 52n should be doubled in relation to the configuration in FIG. 4a, because the number of separately switchable electrically conducting bodies is doubled. This disadvantage can be eliminated with the embodiment which is illustrated in FIG. 4c. In this embodiment only one array of electrically conducting bodies is used which preferably, as schematically indicated, have a relatively large diameter. The pulse generator to be used with this configuration is adapted in a suitable manner such, that initially the electrode body 62a is connected with the one terminal of the power supply source 50 whereas simultaneously the neighbouring electrode body 62b is connected to the other terminal of the power supply source 50. Therewith a field is generated between both bodies the shape of which is schematically indicated in FIG. 4b. Subsequently, by correct switching a field is generated between the electrode body 62b and the neighbouring electrode body 62c, etc. The clear advantage of this embodiment is that only one electrode 60 is needed, which, however, implies that a rather complicated pulse generator has to be used of which an embodiment is schematically illustrated in FIG. 5.

Figure 5:
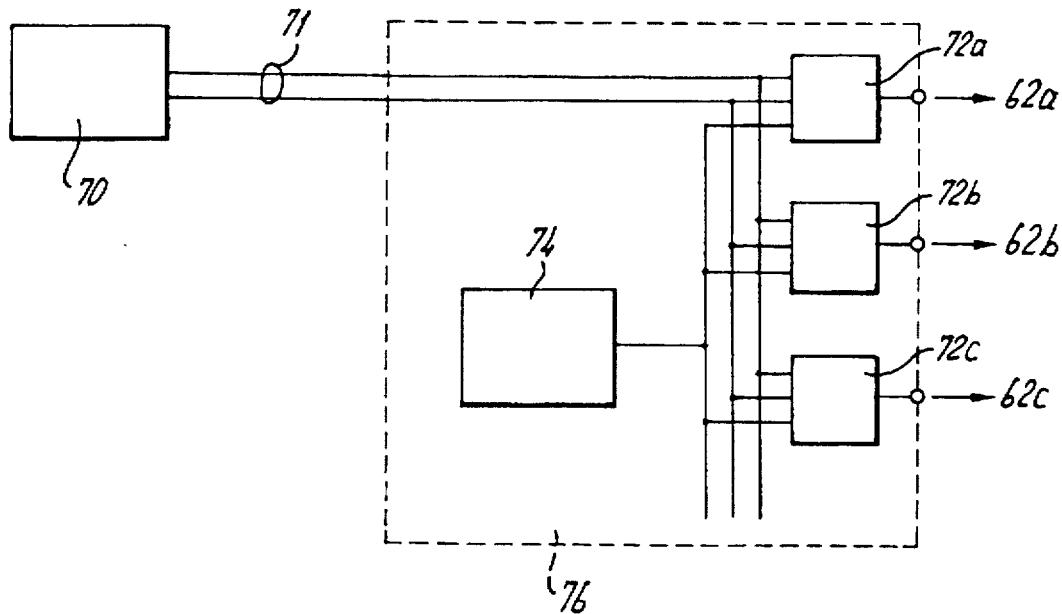
FIG. 5 illustrates an other embodiment of the power supply and control circuit.

The pulse generator from FIG. 5 comprises the energy source 70, which through the cable 71 is connected to the actual pulse generator 76. Both terminals of the cable 71 are in this case connected to one of the power switches 72a, 72b, . . . The control input of each of these power switches 72 is connected to the electronic control circuit 74. Each power switch 72 can be considered as a three-position switch connecting the output to either the one terminal of the power supply source, or the other terminal of the power supply source, or with none of the terminals. It will be clear that the control signals supplied by the generator 76 should be adapted to this embodiment of the power supply switch 72. It is in this respect, however, pointed out that the practical realization of a suitably functioning pulse generator after reading the above paragraphs is considered within reach of the average practitioner, so that the provision of further details is considered superfluous.

It is remarked that above the separate electrode bodies are indicated as rings or sleeves of electrically conducting material, attached around a multicore cable with smaller diameter than the diameter of the rings or sleeves. It will be clear to the average practitioner that the diameter of the rings or sleeves and the diameter of the cable can be selected such that the rings are closely fit around the outer jacket of the multicore cable, so that eventual problems in relation to the sealing between the rings and the cables are decreased and furthermore the cable as a whole obtains a more smooth shape, so that the cable can be dragged with less mechanical resistance across the sea bottom.

Figure 6A:
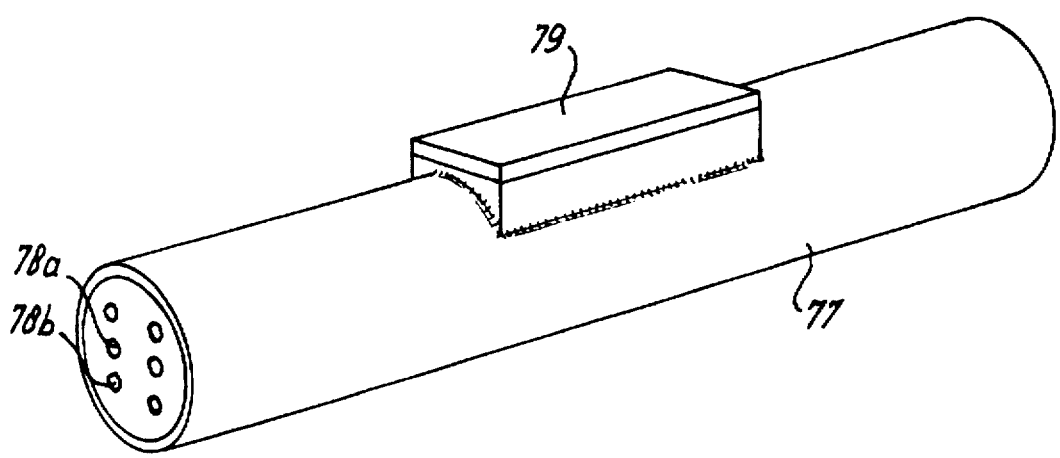
FIGS. 6a and 6b illustrate other embodiments of the cable and the electrode segments.

Instead of the rings or sleeves also flat platelets can be used which for instance by means of an adhesive or something else are attached to the outer jacket of the cable. An example thereof is schematically illustrated in FIG. 6a. The outer jacket of the cable is in this figure references by 77 and within the jacket there are the mutually insulated conductors 78a, 78b, . . . On the outer jacket of the cable an electrode body shaped as an elongated rectangular flat platelet 79 of electrically conducting material is adhered or glued using a suitable adhesive or glue. Such adhesives are as such known and the average practitioner does not need further details. It will be understood that, preceding the application of adhesive or glue one of the conductors 78a, 78b, . . . is guided through the jacket 77 of the cable outside and is in an electrically conductive manner attached to the platelet 79 in a similar manner as schematically illustrated in FIG. 2.

Figure 6B:
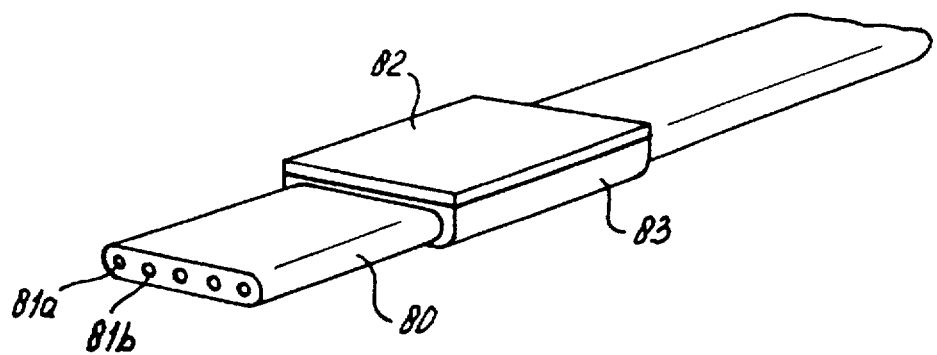

It is furthermore conceivable to apply, instead of a multicore cable with an approximately circular cross section of the outer jacket, a band or ribbon cable in which the various cores are more or less positioned beside each other. In that case it is preferred to embody the electrically conducting bodies not as a ring or sleeve, as discussed above, but to embody them as a flat platelet, which in a suitable manner is attached to the ribbon cable. A conceivable practical embodiment is schematically illustrated in FIG. 6a. The cable comprises a number of electrical conductors 81a, 81b, . . . , which extend in general parallel in the same plane and are positioned within and surround by an insulating jacket 80. Band cables of this type are known as such. As is illustrated in FIG. 6b a flat plate 82 of electrically conducting material is attached to the cable by means of a mounting element 83, which on the one hand adheres very well to the plate 82 and on the other hand adheres very well to the jacket 80 of the multicore cable. With cables of this type it is in general possible to free one of the cores 81 out of the cable without obstructing the insulation of the other cores. That implies that the use of such a band cable minimizes eventual problems in relation to penetration of fluid in the cable.

I claim:

1. Electro-fishing apparatus comprising:
   a trawl net,
   a plurality of electrodes in front of the net when the net is being towed,
   a pulse generator supplying pulses to said plurality of electrodes to generate a pulsed electric field,
   a power source providing electrical power to the pulse generator,
   each electrode connected through a separate insulated connection cable to said pulse generator,
   switching means having an input and a plurality of outputs, the input connected to the pulse generator and each output connected to one of said insulated connection cables,
   a control circuit controlling the switching means so that only two of said electrodes at a time are powered by the pulse generator whereby an electric field is generated only between said two electrodes.

2. Electro-fishing apparatus according to claim 1, wherein at least part of the electrode consists of an electrically conducting body with a water contacting surface having a water salinity-specific electrical resistance.

3. Electro-fishing apparatus according to claim 1, wherein the control means control the switching means such that sequential order electric fields are generated between two different electrodes or electrode bodies respectively.

4. Electro-fishing apparatus according to claim 2, wherein the control means control the switching means such that sequential order electric fields are generated between two different electrodes or electrode bodies respectively.

5. Electro-fishing apparatus comprising:
   a trawl net,
   a plurality of electrodes in front of the net when the net is being towed,
   a pulse generator supplying pulses to said plurality of electrodes to generate a pulsed electric field,
   a power source providing electrical power to the pulse generator,
   at least part of the electrodes consisting of electrically conducting bodies, each of said electrically conducting bodies having a water contacting surface having water salinity-specific electrical resistance,
   the other part of the electrodes consisting of at least an elongated conductor which through a further insulated conductor is connected to the pulse generator,
   said electrically conducting bodies connected through a separate insulated connection cable to said pulse generator,
   switching means having an input and a plurality of outputs, the input connected to the pulse generator and each output connected to one of said insulated connection cables,
   a control circuit controlling the switching means wherein through its insulated connection cable only one conducting body at a time is powered by the pulse generator together with said elongated conductor whereby an electric field is generated only between said only one conducting body and the elongated conductor.

6. Electro-fishing apparatus comprising:
   a trawl net,
   a plurality of electrodes in front of the net when the net is being towed,
   a pulse generator supplying pulses to said plurality of electrodes to generate a pulsed electric field,
   a power source providing electrical power to the pulse generator,
   at least part of the electrodes consisting of a first set of electrically conducting bodies with a water contacting surface having a water salinity-specific electrical resistance,
   the other part of the electrodes consisting of a second set of conducting bodies with a water contacting surface having a water salinity-specific electrical resistance,
   each of the electrically conducting bodies connected through a separate insulated connection cable to said pulse generator,
   switching means having an input and a plurality of outputs, the input connected to the pulse generator and each output connected to one of said insulated connection cables,
   a control circuit controlling the switching means wherein through its insulated connection cable only at a time only one conducting body of the first set and only one conducting body of the second set are powered by the pulse generator whereby an electric field is generated only between said two conducting bodies.

7. Electro-fishing apparatus comprising:
   a trawl net,
   a plurality of electrodes in front of the net when the net is being towed,
   a pulse generator supplying pulses to said plurality of electrodes to generate a pulsed electric field,
   a power source providing electrical power to the pulse generator,
   at least one of the electrodes consisting of electrically conducting bodies, each of said electrically conducting bodies having a water contacting surface having a water salinity-specific electrical resistance,
   the other part of the electrodes consisting of an electrically conducting body with a water contacting surface having a water salinity-specific electrical resistance,
   each of said electrically conducting bodies connected through a separate insulated connection cable to said pulse generator,
   switching means having an input and a plurality of outputs, the input connected to the pulse generator and each output connected to one of said insulated connection cables,
   a control circuit controlling the switching means wherein through its insulated connection cable only two conducting bodies at a time are powered by the pulse generator whereby an electric field is generated only between said two conducting bodies.

* * * * *